(12) United States Patent
Nishihara

(10) Patent No.: US 10,118,302 B2
(45) Date of Patent: Nov. 6, 2018

(54) CERAMIC CUTTING TOOL

(71) Applicant: Kyocera Corporation, Kyoto-shi, Kyoto (JP)

(72) Inventor: Takanori Nishihara, Takatsuki (JP)

(73) Assignee: Kyocera Corporation, Kyoto-shi, Kyoto (JP)

( * ) Notice: Subject to any disclaimer, the term of this patent is extended or adjusted under 35 U.S.C. 154(b) by 0 days.

(21) Appl. No.: 15/556,629

(22) PCT Filed: May 25, 2016

(86) PCT No.: PCT/JP2016/065424
§ 371 (c)(1),
(2) Date: Sep. 8, 2017

(87) PCT Pub. No.: WO2016/190343
PCT Pub. Date: Dec. 1, 2016

(65) Prior Publication Data
US 2018/0056532 A1    Mar. 1, 2018

(30) Foreign Application Priority Data

May 25, 2015 (JP) ................. 2015-105088

(51) Int. Cl.
*B26B 9/00* (2006.01)
*B26B 9/02* (2006.01)
(Continued)

(52) U.S. Cl.
CPC ............ *B26B 9/02* (2013.01); *C04B 35/4885* (2013.01); *C04B 35/6455* (2013.01);
(Continued)

(58) Field of Classification Search
CPC ... B26B 9/02; C04B 35/4885; C04B 35/6455; C04B 41/0036; C04B 2235/5445; C04B 2235/5454; C04B 2235/96
(Continued)

(56) References Cited

U.S. PATENT DOCUMENTS 7,963,042 B2 * 6/2011 Keller ................ A61B 17/3211
30/350
8,499,673 B2 * 8/2013 Keller ................ A61B 17/3211
30/314
(Continued)

FOREIGN PATENT DOCUMENTS

EP    2298713 A1    3/2011
JP    S62159854 U1   10/1987
(Continued)

OTHER PUBLICATIONS

International Search Report based on Application No. PCT/JP2016/065424 (2 Pages) dated Aug. 16, 2016.
(Continued)

*Primary Examiner* — Omar Flores Sanchez
(74) *Attorney, Agent, or Firm* — Viering, Jentschura & Partner mbB

(57) ABSTRACT

Provided is a ceramic cutting tool including a blade body containing zirconium oxide as a primary component, the blade body containing particles containing any one of aluminum oxide, silicon carbide, or silicon nitride as a primary component.

5 Claims, 10 Drawing Sheets

(51) Int. Cl.
  *C04B 35/488* (2006.01)
  *C04B 35/645* (2006.01)
  *C04B 41/00* (2006.01)

(52) U.S. Cl.
  CPC .. *C04B 41/0036* (2013.01); *C04B 2235/5445* (2013.01); *C04B 2235/5454* (2013.01); *C04B 2235/96* (2013.01)

(58) Field of Classification Search
  USPC .......................................... 30/350, 357, 346
  See application file for complete search history.

(56) References Cited

U.S. PATENT DOCUMENTS

| | | | |
|---|---|---|---|
| 2003/0000344 A1 | 1/2003 | Suzuki | |
| 2004/0168326 A1* | 9/2004 | Korb | B21D 53/64 30/350 |
| 2004/0186493 A1* | 9/2004 | McWhorter | A61F 9/013 606/166 |
| 2006/0207110 A1* | 9/2006 | Nishigaki | B26B 3/00 30/350 |
| 2009/0320299 A1* | 12/2009 | Kuhn | B08B 1/00 30/169 |
| 2012/0252655 A1 | 10/2012 | Kuntz et al. | |
| 2014/0202010 A1* | 7/2014 | Sato | B26B 9/02 30/350 |

FOREIGN PATENT DOCUMENTS

| | | |
|---|---|---|
| JP | S63318288 A | 12/1988 |
| JP | H04275977 A | 10/1992 |
| JP | H1157237 A | 3/1999 |
| JP | 2000343146 A | 12/2000 |
| JP | 2004358069 A | 12/2004 |
| JP | 2005206392 A | 8/2005 |
| WO | 2009157508 A1 | 12/2009 |

OTHER PUBLICATIONS

The extended European Search Report based on Application No. 16800047.9 (10 Pages) dated Dec. 12, 2017.
Thomson Scientific, "AN 1992-376642 & JP H04 275977 A (Osaka Cement KK) Oct. 1, 1992 (Oct. 1, 1992) XP002776135", Database WPI, Week 199246.

* cited by examiner

__US 10,118,302 B2__
CERAMIC CUTTING TOOL

RELATED APPLICATIONS

The present application is a national stage entry according to 35 U.S.C. 371 of PCT application No.: PCT/JP2016/065424 filed on May 25, 2016, which claims priority from Japanese application No.: 2015-105088 filed on May 25, 2015, which are incorporated herein by reference in their entirety.

TECHNICAL FIELD

The present invention relates to a ceramic cutting tool.

BACKGROUND ART

In recent years, ceramics, in particular, zirconia ceramics which exhibit relatively high wear resistance and toughness, have been used as materials for cutting tools such as kitchen knives (see Patent Literatures 1, 2, and the like). There has been a demand in recent years for ceramic cutting tools to exhibit longer lasting sharpness.

CITATION LIST

Patent Literature

Patent Literature 1: JP S62-159854 UM-A
Patent Literature 2: JP 2004-358069 A

SUMMARY OF INVENTION

The ceramic cutting tool of the present disclosure has a blade body containing zirconium oxide as a primary component, and this blade body contains particles containing any one of aluminum oxide, silicon carbide, or silicon nitride as a primary component.

DESCRIPTION OF EMBODIMENTS

Figure 1:
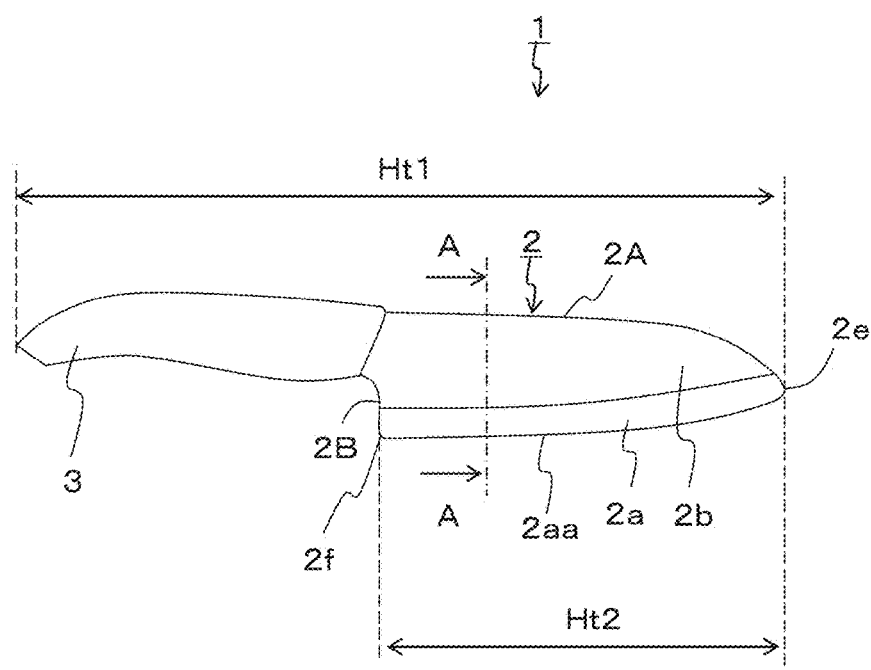
FIG. 1 is a plan view of a ceramic cutting tool.

The ceramic cutting tool of the present disclosure will be described hereinafter with reference to the drawings. Note that the drawings used in the following explanations are schematic drawings, and the dimensional ratios and the like in the drawings do not necessarily match those of an actual cutting tool.

Ceramic Cutting Tool

The ceramic cutting tool of the present disclosure will be described hereinafter. A ceramic cutting tool 1 of the present disclosure has a blade body 2 containing zirconium oxide as a primary component. The blade body 2 contains particles containing any one of aluminum oxide, silicon carbide, or silicon nitride as a primary component.

Figure 2:
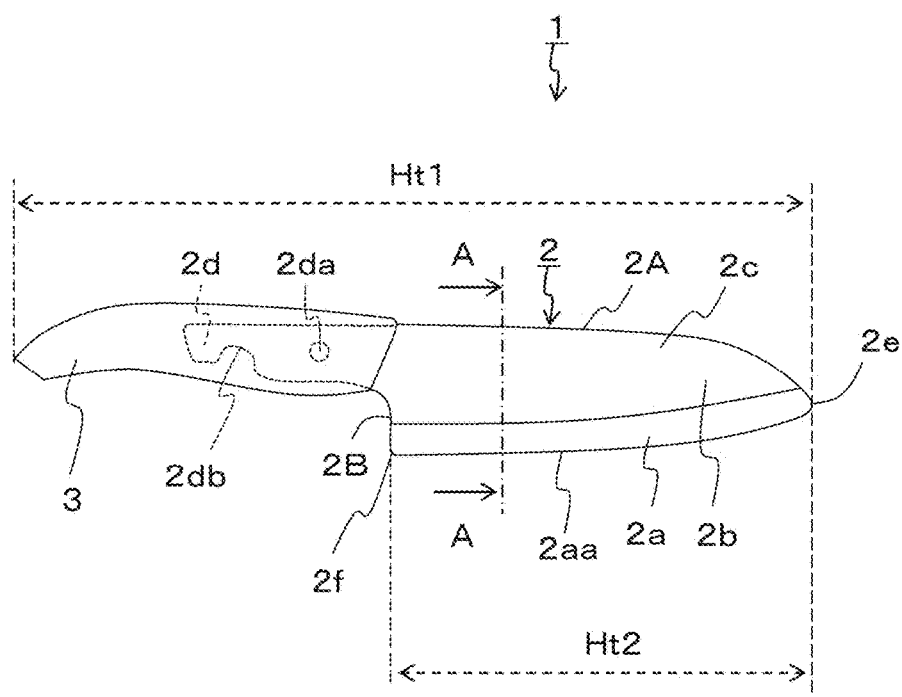
FIG. 2 is a partial perspective view of the ceramic cutting tool of FIG. 1.

The total length Ht1 of the ceramic cutting tool 1 is, for example, not less than 8 cm and not greater than 40 cm. As illustrated in FIGS. 1 and 2, the ceramic cutting tool 1 includes the blade body 2 and a handle 3. In addition, as illustrated in FIG. 2, part of the blade body 2 is disposed inside the handle 3. The ceramic cutting tool 1 may also be configured with only the blade body 2 without having a handle 3.

The blade body 2 is set to a shape and size in accordance with an application as a cutting tool. The specific shape of the blade body 2 may be set to the shape of a Japanese kitchen knife such as a broad-bladed kitchen knife or an all-purpose kitchen knife, a Western kitchen knife such as a butcher knife, a Chinese kitchen knife, or the like, for example. Note that the blade body 2 is not limited to a kitchen knife and may, for example, have the shape of a knife, a surgical instrument, or the like.

The blade body 2 includes a base body exposed part 2c which is exposed from the handle 3, and a core 2d disposed inside the handle 3. The base body exposed part 2c includes a blade part 2a and a base body part 2b.

The width of the core 2d may be set as needed and is determined, for example, by the relationship with the width of the base body exposed part 2c. A hole 2da is provided in the core 2d. A single hole 2da may be provided, or a plurality of holes 2da may be provided. When a plurality of holes 2da are provided, the blade body 2 may be firmly fixed to the handle 3. In this embodiment, the core 2d is provided with a hook 2db. The hook 2db is provided so that a notch is formed from a part of the core 2d.

The hole 2da is formed into a circular shape with a radius of not less than 0.5 mm and not greater than 3 mm, for example. In addition, it is possible to reduce the incidence of the blade body 2 slipping out of the handle 3 by fixing the blade body 2 to the handle 3 via the hole 2da or the hook 2db. Further, a metal plate may also be disposed inside the handle 3. When a metal plate is disposed inside the handle 3, it may be detected by a metal detector or the like.

The handle 3 is made of a resin, ceramic, wood, or the like. Examples of resin materials include synthetic resins such as ethylene, polypropylene, and polyester, elastomer resins, so-called ABS resins, or materials prepared by vulcanizing synthetic rubbers to an appropriate hardness. An antimicrobial agent may be added to the resin, or it may be surface-treated with an antimicrobial agent as necessary. When the handle 3 is made of a resin, a resin having a bending modulus of elasticity of not less than 400 kg/cm$^2$ and not greater than 4000 kg/cm$^2$, for example, and a compressive elastic modulus of not less than 520 kg/cm$^2$ and not greater than 3300 kg/cm$^2$, for example, may be used.

Figure 3:
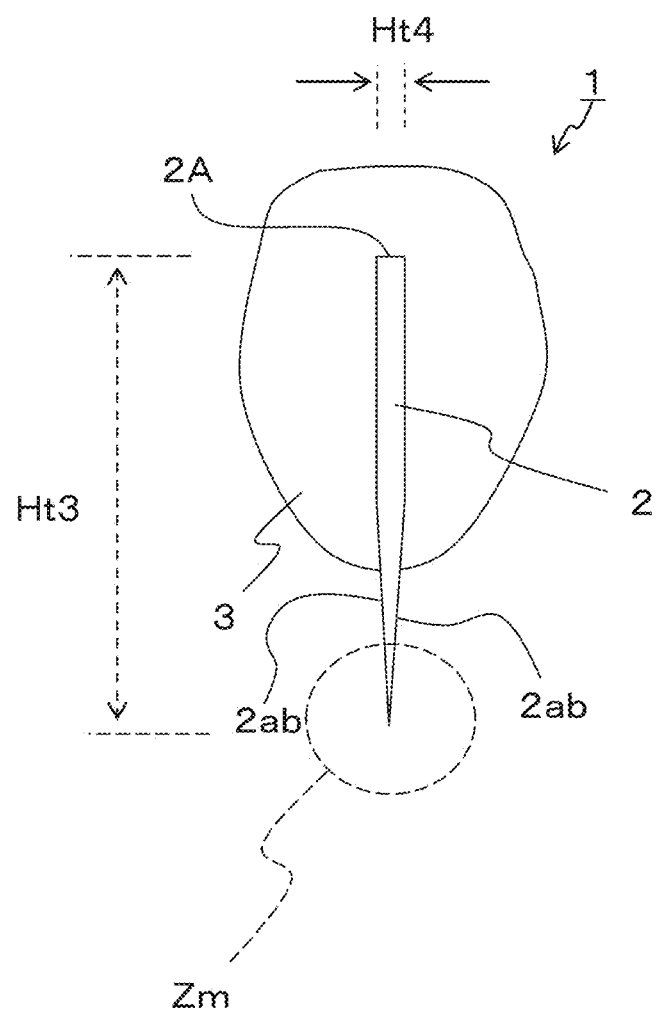
FIG. 3 is a view facing the tip of the ceramic cutting tool of FIG. 1.

The width Ht3 (blade width) in a direction perpendicular to the total length Ht1 of the blade body 2 illustrated in FIG. 3, which is a view facing the tip 2e of the ceramic cutting tool 1, may be set appropriately in accordance with the application of the ceramic cutting tool 1. For example, when the ceramic cutting tool 1 is used as a general kitchen knife, the width Ht3 may be set to not less than 15 mm and not greater than 50 mm. The thickness Ht4 of the blade body 2 is the thickest part and may be set to not less than 1.3 mm and not greater than 5.0 mm, for example.

As illustrated in FIGS. 1 and 2, the cutting blade ridge 2aa (simply referred to as the top part 2aa hereafter) of the blade part 2a is connected to the upper surface 2A (back) and the side surface 2B of the blade body 2. In the side views of FIGS. 1 and 2, the tip 2e of the blade body 2 (more specifically, the blade part 2a) is curved. The curvature of the curve of the tip 2e of the blade body 2 is not less than 2 mm and not greater than 10 mm, for example. The curving of the tip 2e of the blade body 2 reduces the chipping of the tip 2e. The blade length (length of the portion with a blade edge) Ht2 of the blade body 2 may be set appropriately in accordance with the application, and when the ceramic cutting tool 1 is used as a general kitchen knife or the like, the blade length Ht2 may be set to not less than 5 cm and not greater than 20 cm, for example.

As illustrated in FIGS. 1 and 2, the central end portion 2f to which the blade part 2a and the side surface 2B are connected may also be curved. As a result of such curving, chipping of the blade body 2a is suppressed. The curvature of the central end portion 2f is set to be smaller than the curvature of the tip 2e. The radius of curvature of the central end portion 2f is not less than 1 mm and not greater than 5 mm, for example.

Figure 4:
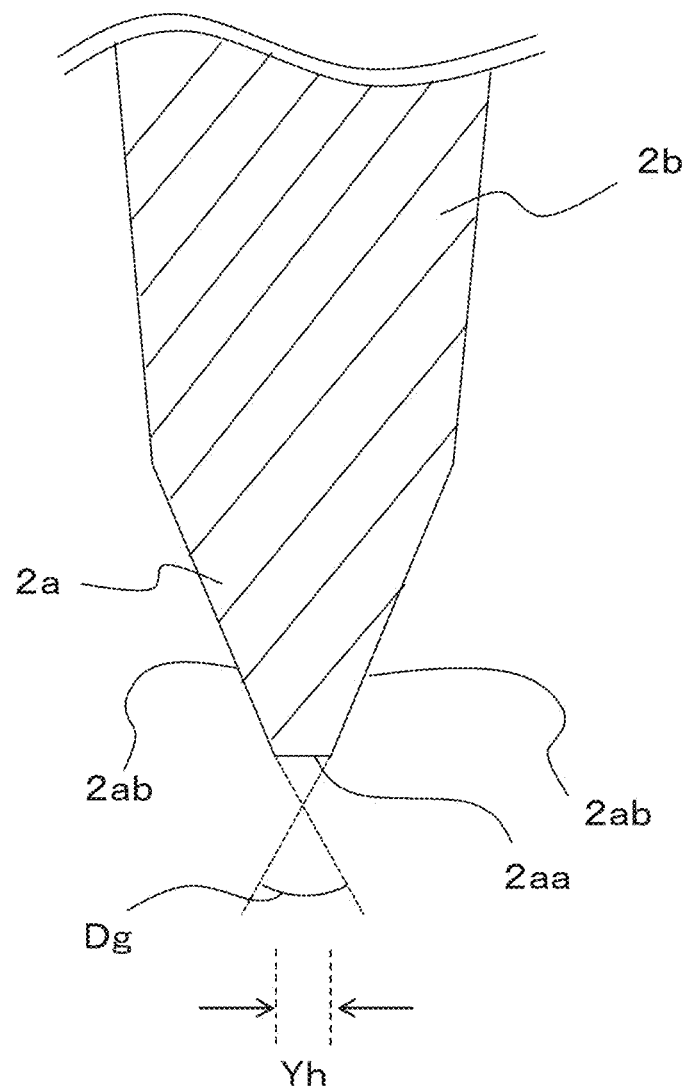
FIG. 4 is a cross-sectional view of the portion corresponding to the Zm region of FIG. 3 when the ceramic cutting tool is cut along line A-A of FIGS. 1 and 2.

Next, the configuration of the blade part 2a will be described using FIG. 4, which is a cross-sectional view of the portion corresponding to the Zm region of FIG. 3 when the ceramic cutting tool 1 is cut along line A-A of FIGS. 1 and 2. The blade part 2a of the blade body 2 includes two cutting edge side surfaces 2ab disposed at an angle so that the spacing narrows toward the top part 2aa from the base body part 2b. The top part 2aa corresponds to a surface interposed between the cutting blade ridge side edges of the two cutting edge side surfaces 2ab. In FIG. 4, the top part 2aa is illustrated as a flat surface, but the top part 2aa may also have a shape in which fine irregularities are disposed in a continuous manner. When the width Yh of the top part 2aa is relatively small, the sharpness is enhanced, and when the width Yh of the top part 2aa is relatively large, defects such as so-called blade nicks are unlikely to occur. For example, when the width Yh of the top part 2aa is not less than 1 μm and not greater than 10 μm, the sharpness and durability are relatively high. In addition, when the blade tip angle Dg of the blade part 2a is set to a range of 35°±5° in the cross-sectional view, for example, the sharpness and the durability of the ceramic cutting tool 1 are, again, relatively high.

The blade body 2 is made of a sintered compact of a ceramic material. The ceramic material constituting the blade body 2 is a material containing zirconium oxide (zirconia) as a primary component. A primary component refers to a component contained at a ratio of not less than 50 vol. %. In addition to zirconia, yttria or the like may also be contained as a stabilizer.

In the present disclosure, the blade body 2 contains particles 4 containing any one of aluminum oxide, silicon carbide, or silicon nitride as a primary component. Note that the particles 4 described here are particles with a higher Vickers hardness than zirconia. In the specification of the primary component of the particles 4, the primary component may be identified by measurements using an X-ray diffractometer. In addition, when Al and O, for example, are confirmed by an energy dispersive X-ray spectrometer attached to a scanning electron microscope, the composition may be considered aluminum oxide. Further, when it is confirmed that the substance is a powder and the regions where Al is present and the regions where O is present in the target powder overlap in a color mapping by an electron beam microanalyzer, the composition may be considered aluminum oxide.

A case in which the particles 4 are made of aluminum oxide will be described hereinafter. The zirconia content of the blade body 2 is not less than 50 vol. % and not greater than 95 vol. %, for example. In the blade body 2, the content of alumina particles (particles 4) is not less than 5 vol. % and less than 50 vol. %. When zirconia and alumina particles are contained at such content ratios, the sharpness of the ceramic cutting tool 1 is maintained over a relatively long period of time.

The average particle size of the particles 4 is not less than 10 nm and not greater than 800 nm, for example. The average particle size may be calculated by measuring the particle diameter of the particles 4 present in an image magnified by 10000 times with a scanning electron microscope. Note that the average particle size may also be calculated by analyzing an image or photograph taken using a scanning electron microscope with image analysis software. When the average particle size is within the range described above, the sharpness of the ceramic cutting tool 1 is maintained over a relatively long period of time.

Figure 5A:
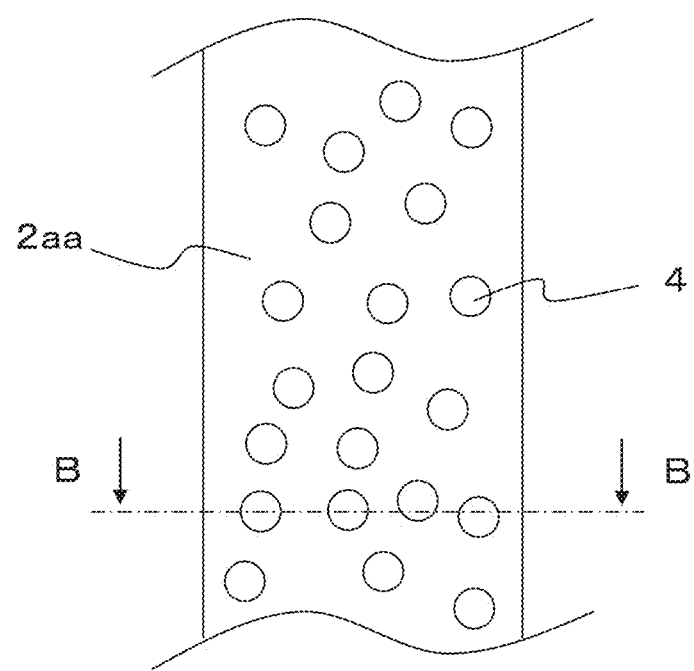
FIG. 5A is a schematic diagram of a view facing the top part of the ceramic cutting tool of FIG. 1.
Figure 5B:
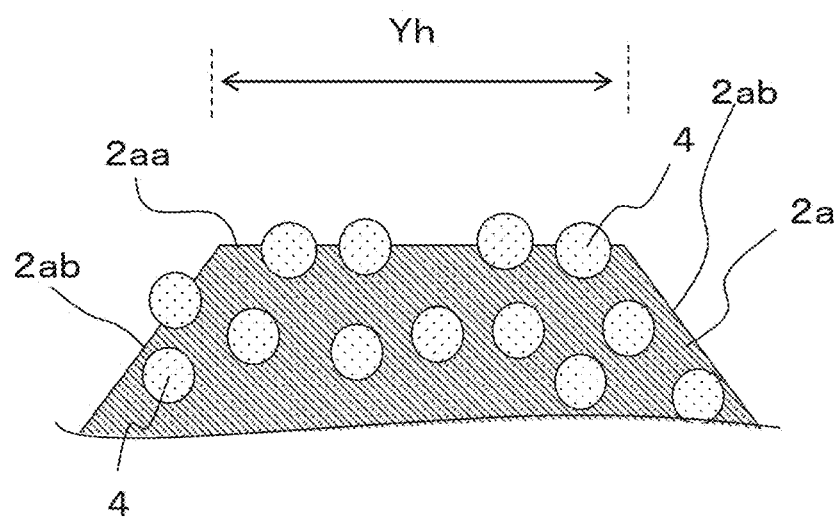
FIG. 5B is a cross-sectional schematic diagram when the ceramic cutting tool is cut along line B-B in FIG. 5A.

The particles 4 are contained in the blade part 2a of the blade body 2. More specifically, as illustrated in FIGS. 5A and 5B, the particles 4 are positioned so that some of them are exposed from the top part 2aa of the blade part 2a. When the particles 4 are positioned so as to be exposed from the top part 2aa, the sharpness of the ceramic cutting tool 1 is relatively high. The particles 4 may also be distributed over the entire blade body 2. When the particles 4 are distributed over the entire blade body 2, it is possible to reduce the incidence of chipping or breaking of the blade body 2 over the entire blade body 2. The particles 4 may also be distributed and positioned in only certain regions of the blade part 2a including the top part 2aa. In this case, the blade tip portion of the blade part 2a is less likely to be chipped. In addition, the average particle size of the particles 4 may differ in accordance with the position of the blade body 2. For example, the average particle size of the particles 4 contained in the base body part 2b may be larger than the average particle size of the particles 4 contained in the blade part 2a.

As illustrated in FIG. 5B, the particles 4 are positioned on the top part 2aa so that some of the particles are partially embedded inside a sintered compact containing zirconium oxide as a primary component. When some of the particles 4 are positioned so as to be partially embedded in the top part 2aa, the particles are unlikely to drop off from the top part 2aa when an object is cut by the ceramic cutting tool 1, and the sharpness of the ceramic cutting tool 1 is maintained over a relatively long period of time. A plurality of particles 4 may be distributed and positioned so that the particles are distanced from one another. Alternatively, a plurality of aggregates each formed by the cohesion of a plurality of particles 4 may also be formed. The size of the aggregate of a plurality of particles 4 is not less than 500 nm and not greater than 5 μm, for example.

Other Example of Ceramic Cutting Tool

There may also be markings on the surface of the blade body 2 (base body part 2b). The markings may be characters, figures, patterns, or designs. Having markings enhances the palatability to consumers. In addition, using markings containing the characters or figures of a manufacturer, vendor, or the like makes it possible to easily identify the manufacturer, vendor, or the like.

The reflectance of portions with the marking may be lower than other portions of the blade body 2. The visibility of a portion with low reflectance is high. Specifically, when a laser is applied to the base body part 2b of the blade body 2, the surface is modified so as to give off a black color tone with low reflectance. Modification includes oxidation, carbonization, and the like, for example. The base body 2b containing particles 4 made of alumina exhibits a low transmittance in comparison to the base body 2b without the particles 4 (when the zirconia content is 100 vol. %). In this case, when the base body part 2b is irradiated with a laser beam, the laser beam is unlikely to be diffused by the base body part 2b, and the surface becomes susceptible to modification by the laser beam. Therefore, when the base body part 2b also contains the particles 4, the markings on the ceramic cutting tool 1 assume a stronger black color than when the particles 4 made of alumina are not added. That is, the markings on the ceramic cutting tool 1 have a lower light reflectance than when the particles 4 made of alumina are not added. As a result, it is possible to enhance the visibility of the markings. Various methods may be used as a method of measuring the reflectance. For example, a microspectroscopic method or the like may be used.

Production Method for Ceramic Cutting Tool

The ceramic cutting tool 1 described above can be produced with the following method, for example.

First, a blade body 2 made of a ceramic is produced. The blade body 2 is produced, for example, by adding an alumina powder to a zirconia powder containing an yttria powder at a concentration of not less than 1.5 mol % and not greater than 4 mol %, adding an acrylic, wax, or polyethylene glycol-based binder in an amount of not less than 2 vol. % and not greater than 10 vol. %, and granulating the mixture. When preparing granules, each powder is mixed so that the zirconia content is not less than 50 vol. % and not greater than 95 vol. %, for example, and so that the alumina content is not less than 5 vol. % and less than 50 vol. %, for example.

Next, the obtained granules are pressure-molded under conditions with a molding pressure of not less than 1000 kg/cm$^2$ and not greater than 1500 kg/cm$^2$ using a metal mold into the shape of the blade body 2 illustrated in FIG. 2. The powder compact is then fired to obtain a zirconia sintered compact. The obtained zirconia sintered compact is edged so as to obtain a blade body 2 made of a ceramic. Note that in the molding method described above, molding may be performed with a method ordinarily employed by a person skilled in the art in addition to molding using a metal mold. For example, slip casting, plastic molding (injection method), a rubber press method, a hot press method, an extrusion molding method, or the like may be used as needed.

The firing temperature may be set appropriately in accordance with the material. In the case of zirconia, the material is fired at a temperature of not lower than 1300° C. and not higher than 1700° C., for example. After firing, the obtained zirconia sintered compact may be treated with a hot isotropic pressurization method as necessary, wherein the sintered compact is held at a pressure of not less than 1500 kg/cm$^2$ and not greater than 2500 kg/cm$^2$ for 2 to 5 hours. The blade body 2 is produced in this way.

Polishing the blade body 2 produced in this way makes it possible to form the blade part 2a. When polishing the blade body 2, it is preferable to use a polishing material made of particles smaller than the average particle size of the particles 4 or to use a material having a Vickers hardness higher than that of zirconia and lower than that of the particles 4 made of alumina, for example. By using such a polishing material, the zirconia portion is actively polished, and the dropping off of the particles 4 is suppressed, which makes it possible to dispose a plurality of particles 4 on the top part 2aa of the blade tip so that some of the particles are partially exposed. The handle 3 is then attached to the blade body 2 so that a core 2d is positioned on the inside.

Figure 6:
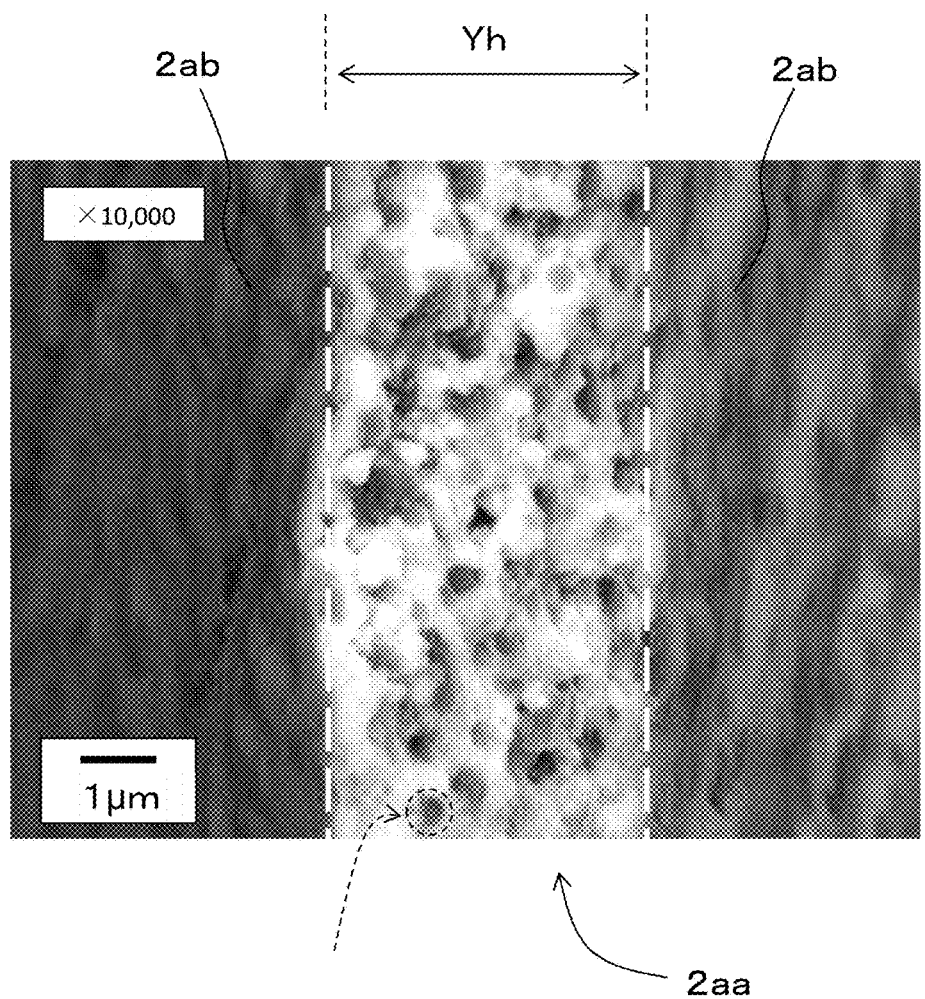
FIG. 6 is a scanning electron microscope image in which the top part of the ceramic cutting tool is observed.
Figure 7A:
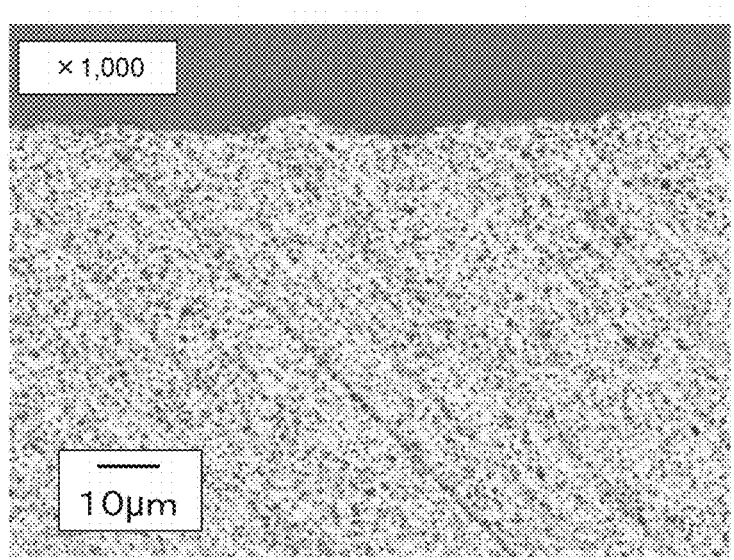
FIG. 7A is a scanning electron microscope image in which the side surface of the blade part of the ceramic cutting tool is observed at a magnification of 1000 times.
Figure 7B:
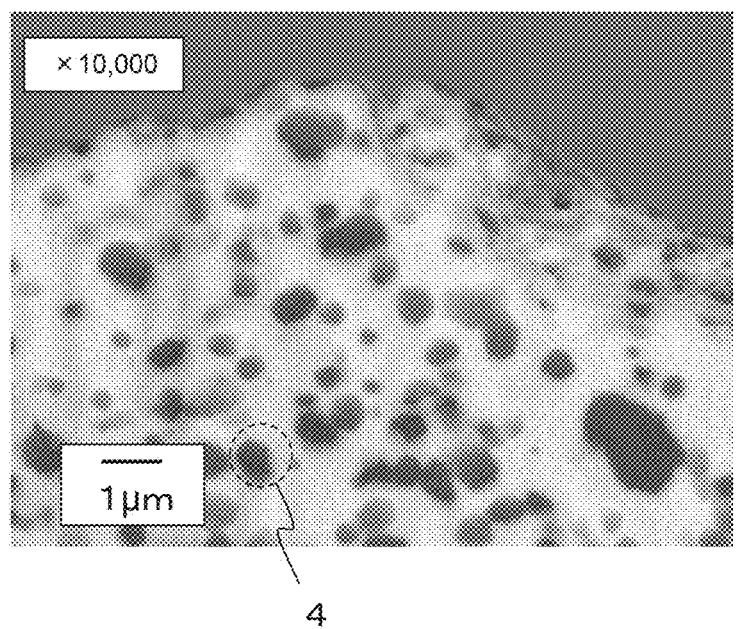
FIG. 7B is a scanning electron microscope image in which the side surface of the blade part of the ceramic cutting tool is observed at a magnification of 10000 times from a side surface side.

The results of observing the ceramic cutting tool 1 produced using the ceramic cutting tool production method described above with a scanning electron microscope are illustrated in FIGS. 6, 7A, and 7B. FIG. 6 illustrates the results of observing the top part 2aa of the ceramic cutting tool 1. FIG. 7A is a scanning electron microscope image in which the blade part 2a of the ceramic cutting tool 1 is observed at a magnification of 1000 times from the side surface. FIG. 7B is a scanning electron microscope image in which the blade part 2a of the ceramic cutting tool 1 is observed at a magnification of 10000 times from the side surface. Note that FIGS. 6, 7A, and 7B are images obtained by measuring reflected electrons with a scanning electron microscope, and the portions with relatively dark color tones such as those present in the areas enclosed by the dotted lines correspond to the particles 4 containing alumina as a primary component.

As illustrated in FIG. 6, the blade body 2 contains a plurality of particles 4 containing alumina as a primary component, and the plurality of particles 4 are exposed on the top part 2aa of the blade body 2. Due to the particles 4, the sharpness of the ceramic cutting tool 1 becomes relatively high. In addition, as illustrated in FIGS. 7A and 7B, the particles 4 are distributed and positioned over the entire blade body 2. The overall hardness of the blade body 2 is relatively high so that the chipping or the like of the blade part 2a or the blade body is suppressed.

EXAMPLES

Next, a paper cutting test was performed by varying the amount of alumina particles (particles 4) added to the zirconia contained in the ceramic cutting tool 1. A paper cutting tests was performed using a so-called Honda sharpness tester. This paper cutting test examines how many sheets of paper can be cut when the cutting tool is pressed onto a stack of 400 sheets of paper with a prescribed pressure. The prescribed pressure was set to 6.2 (N). The results of measuring the initial (first cycle) sharpness and the sharpness of the 128th cycle are shown in Table 1 as a paper cutting test.

TABLE 1

| Zirconia content (vol. %) | Alumina particle content (vol. %) | Initial (first cycle) Sharpness | 128th cycle Sharpness |
|---|---|---|---|
| 100% | 0% | 80 sheets | 50 sheets |
| 95% | 5% | 80 sheets | 65 sheets |
| 90% | 10% | 80 sheets | 70 sheets |
| 80% | 20% | 80 sheets | 75 sheets |
| 60% | 40% | 80 sheets | 75 sheets |
| 50% | 50% | 70 sheets | 65 sheets |
| 40% | 60% | 30 sheets | 27 sheets |

As a result, it can be seen that the sharpness of the 128th cycle is enhanced when the zirconia content is not less than 50 vol. % and not greater than 95 vol. %, that is, when the alumina particle content is not less than 5 vol. % and less than 50 vol. %, in comparison to a conventional ceramic cutting tool containing no alumina particles (when the zirconia content in Table 1 is 100 vol. %). In addition, the results indicated that the initial sharpness and the sharpness of the 128th cycle are both high when the zirconia content is not less than 50 vol. %.

Figure 8:
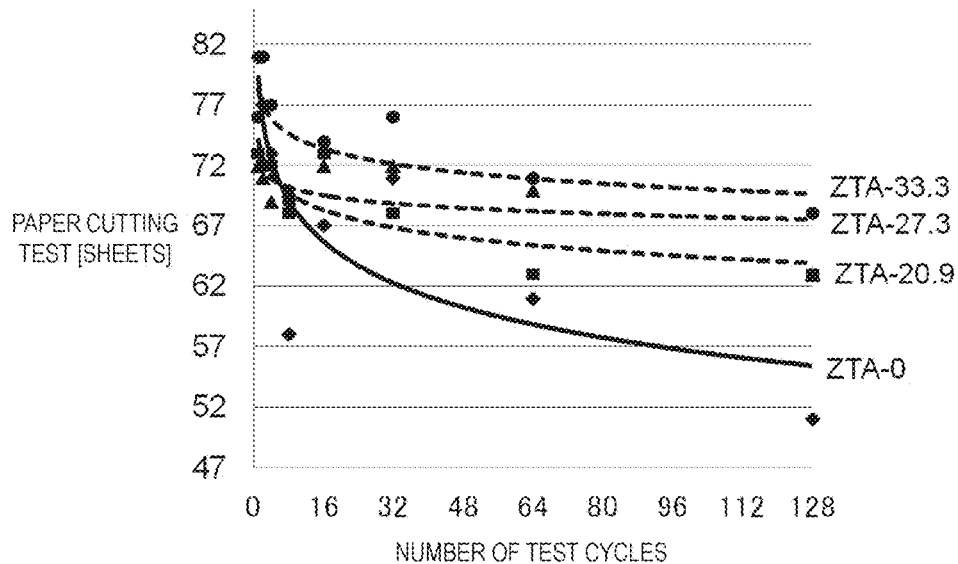
FIG. 8 is a graph showing the results of a sharpness test of the ceramic cutting tool.
Figure 6:
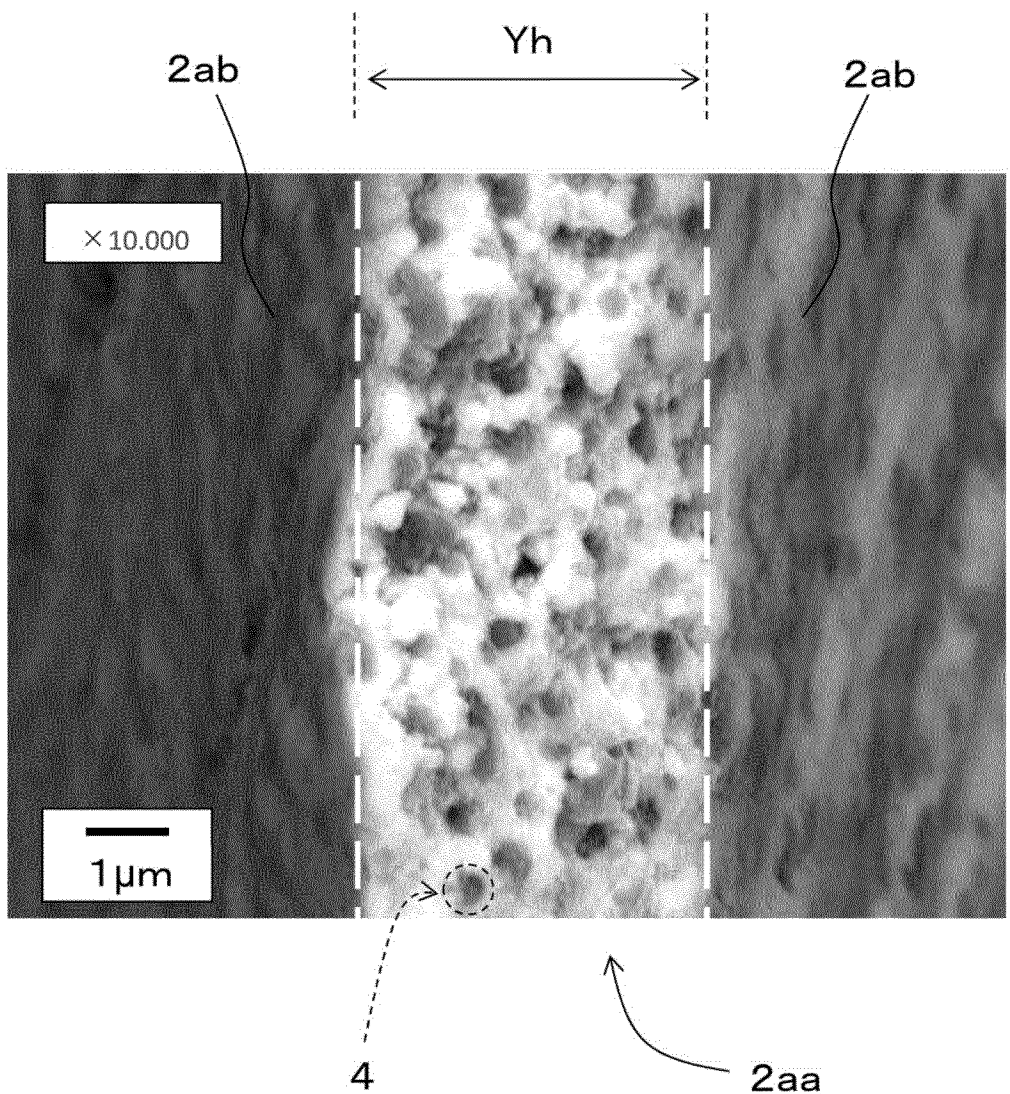

Further, FIG. 8 illustrates the sharpness test results up to the 128th cycle when the zirconia contains alumina particles in amounts of 20.9 vol. % (ZTA-20.9), 27.3 vol. % (ZTA-27.3), and 33.3 vol. % (ZTA-33.3). Note that ZTA-20.9, ZTA-27.3, and ZTA-33.3 are test pieces, and the shape of ZTA-0 is a kitchen knife.

In FIG. 8, the results for ZTA-33.3, ZTA-27.3, and ZTA-20.9 are shown by the dotted lines, and the results for ZTA-0 are shown by the solid line. It can be seen from the results of FIG. 8 that the number of sheets cut in the paper cutting test is highest in order of ZTA-33.3, ZTA-27.3, ZTA-20.9, and then ZTA-0, so the sharpness is maintained in this order. That is, when the added amount of alumina particles is within this range, the sharpness is less likely to decrease than in the comparative example (ZTA-0) having a zirconia content of 100 vol. %.

From the above results, it is possible to suppress decreases in initial sharpness and to maintain sharpness for a long period of time when the zirconia content is not less than 50 vol. % and less than 95 vol. % and the alumina particle content is not less than 5 vol. % and not greater than 50 vol. % in comparison to a conventional zirconia ceramic cutting tool. Quantitative analysis by fluorescent X-ray analysis, for example, may be performed to confirm the volume percent concentration in the ceramic cutting tool 1.

REFERENCE SIGNS LIST

1 Ceramic cutting tool
2 Blade body
2*a* Blade part
2*aa* Top part
2*b* Base body part
2*c* Base body exposed part
2*d* Core
2*da* Hole
2*db* Hook
2*e* Tip
2*f* Central end portion
2A Upper surface
2B Side surface
3 Handle
4 Particle

What is claimed is:

1. A ceramic cutting tool comprising a blade body containing zirconium oxide as a primary component of the blade body, wherein the blade body contains particles containing any one of aluminum oxide, silicon carbide, or silicon nitride as a primary component of the particles, and wherein the blade body includes a blade part, and a plurality of the particles are exposed on a top part of the blade part, and a width of the top part is not less than 1 μm and not greater than 10 μm.

2. The ceramic cutting tool according to claim 1, wherein the particles contain aluminum oxide as the primary component of the particles.

3. The ceramic cutting tool according to claim 1, wherein an average particle size of the particles is not less than 10 nm and not greater than 400 nm.

4. The ceramic cutting tool according to claim 1, wherein the blade body contains the particles in an amount of not less than 5 vol. % and less than 50 vol. %.

5. The ceramic cutting tool according to claim 1, wherein the blade body further comprises markings on a surface thereof, and the markings have a lower light reflectance than other portions of the blade body.

\* \* \* \* \*

UNITED STATES PATENT AND TRADEMARK OFFICE
CERTIFICATE OF CORRECTION

| | | |
|---|---|---|
| PATENT NO. | : 10,118,302 B2 | Page 1 of 2 |
| APPLICATION NO. | : 15/556629 | |
| DATED | : November 6, 2018 | |
| INVENTOR(S) | : Takanori Nishihara | |

It is certified that error appears in the above-identified patent and that said Letters Patent is hereby corrected as shown below:

In the Drawings

Please replace FIG. 6 with the attached replacement sheet FIG. 6.

Signed and Sealed this
Eighth Day of December, 2020

Andrei Iancu
*Director of the United States Patent and Trademark Office*